US008572607B2

(12) United States Patent
Nazeer et al.

(10) Patent No.: US 8,572,607 B2
(45) Date of Patent: Oct. 29, 2013

(54) SYSTEM AND METHOD FOR PERFORMING DESIGNATED SERVICE IMAGE PROCESSING FUNCTIONS IN A SERVICE IMAGE WAREHOUSE

(75) Inventors: Nadeem Ahmad Nazeer, Lehi, UT (US); Robert Wipfel, Draper, UT (US); Alexander Danoyan, Riverton, UT (US)

(73) Assignee: Novell, Inc., Provo, UT (US)

( * ) Notice: Subject to any disclaimer, the term of this patent is extended or adjusted under 35 U.S.C. 154(b) by 1314 days.

(21) Appl. No.: 12/123,036

(22) Filed: May 19, 2008

(65) Prior Publication Data
US 2009/0288082 A1 Nov. 19, 2009

(51) Int. Cl.
*G06F 9/455* (2006.01)
(52) U.S. Cl.
USPC ............................................................ 718/1
(58) Field of Classification Search
None
See application file for complete search history.

(56) References Cited

U.S. PATENT DOCUMENTS

| 7,062,764 B2 | 6/2006 | Cohen et al. |
| 2007/0234356 A1* | 10/2007 | Martins et al. ................ 718/1 |
| 2009/0216975 A1* | 8/2009 | Halperin et al. ............ 711/162 |

OTHER PUBLICATIONS

Halperin et al. (Extending Server-Based Desktop-VM Architecture to Client Machines, Feb. 26, 2008, U.S. Appl. No. 61/031,613).*

* cited by examiner

*Primary Examiner* — Emerson C Puente
*Assistant Examiner* — Sisley Kim
(74) *Attorney, Agent, or Firm* — Haynes and Boone, LLP

(57) ABSTRACT

System and method for performing processing functions on a warehoused service image. In one embodiment, the system comprises a service image warehouse for storing at least one service image; means for modifying the at least one service image by performing at least one of a plurality of service image processing functions on a service image contemporaneously with a user's checking the at least one service image out of the service image warehouse; means for checking the modified service image back into the service image warehouse; and a plurality of compute nodes connected to the service image warehouse to which the at least one service image may be deployed. Each of the compute nodes comprises one of a physical machine and a virtual machine host.

12 Claims, 2 Drawing Sheets

SYSTEM AND METHOD FOR PERFORMING DESIGNATED SERVICE IMAGE PROCESSING FUNCTIONS IN A SERVICE IMAGE WAREHOUSE

BACKGROUND

A virtual machine ("VM") is a software simulation of a computer that runs on a host computer, but behaves as if it were a separate, independent, computer. Multiple VMs can be run on a single host computer. OS virtualization is achieved by inserting a layer of software, referred to as the virtualization layer or "hypervisor," between the OS and the underlying server hardware. The hypervisor is responsible for enabling multiple OS images and their respective applications to share the resources of a single computer, such that each OS image functions as if it has at its disposal all of the resources of the computer, while the hypervisor transparently ensures that the system's resources are properly shared among the different OS images and their applications.

VMs are often advantageously employed in software development, testing, and production environments. In such environments, a VM warehouse may be used to house the VMs that have been created and discovered. When a VM is checked into the VM warehouse, it is brought under version control. Any time modifications are made to a VM, the modified version of the VM can be checked back into the VM warehouse, which assigns the next version number to the VM. When a sufficient number of VM versions have been built and tested and a VM version has been certified for deployment, e.g., in a production environment, the certified version can be designated as a "Gold Master" to be deployed each time an instance of the VM is deployed. The Gold Master designation can be changed at any time.

A VM generally comprises a configuration file and one or more disk or image files. The configuration file contains information needed by the hypervisor to run the VM, as well as information identifying the virtual resources required by the VM. The image files comprise the actual operating system and application files.

SUMMARY

One embodiment is a method for performing processing functions on a warehoused service image. In one embodiment, the system comprises a service image warehouse for storing at least one service image; means for modifying the at least one service image by performing at least one of a plurality of service image processing functions on a the at least one service image contemporaneously with a user's checking the at least one service image out of the service image warehouse; means for checking the modified service image back into the service image warehouse; and a plurality of compute nodes connected to the service image warehouse to which the at least one service image may be deployed. Each of the compute nodes comprises one of a physical machine and a virtual machine host.

DETAILED DESCRIPTION

This disclosure relates generally to virtual machine warehousing and, more specifically, to system and method for automatically performing various processes on a service image each time is checked into the service image warehouse. In accordance with one embodiment, designated processing functions are applied to a service image being during check-in or check-out of a service image from the service image warehouse, depending on the processing function.

Processing functions can be defined at the warehouse level or at the service image level. Service image-level processing functions are defined and applied on a per-service image basis on each service image as the service image is checked into or out of the service image warehouse. Warehouse-level functions are global and applied to all service images in the warehouse, in addition to any service image-level functions defined for the particular service image. For example, virus checking will likely be performed as a warehouse-level function, while rpm database removal may be a service image-level function. The actual processing functions can be implemented by mounting the service image file and running the provided utility thereon. Moreover, if a specified processing function can only be applied to a running service image, then the service image warehouse can deploy the image file and apply the processing function directly thereto. After the processing function specified for a service image is applied, the modified service image may be added back to the service image warehouse. It will be noted that the machine that performs actual image processing functions need not be the same as that which archives or eventually runs the service image. For example, as will be illustrated below, a grid of computer servers, comprising either physical or virtual machines, may be employed which apply image processing functions to an image during a workflow of steps that prepares the image for deployment to final test or a production server In this manner, a pristine, executable service image is always stored in the service image warehouse. Additionally, image processing is managed in a systematic way in order to reliably generate production OS images. This is not possible with currently-available service image warehousing technologies.

Figure 1:
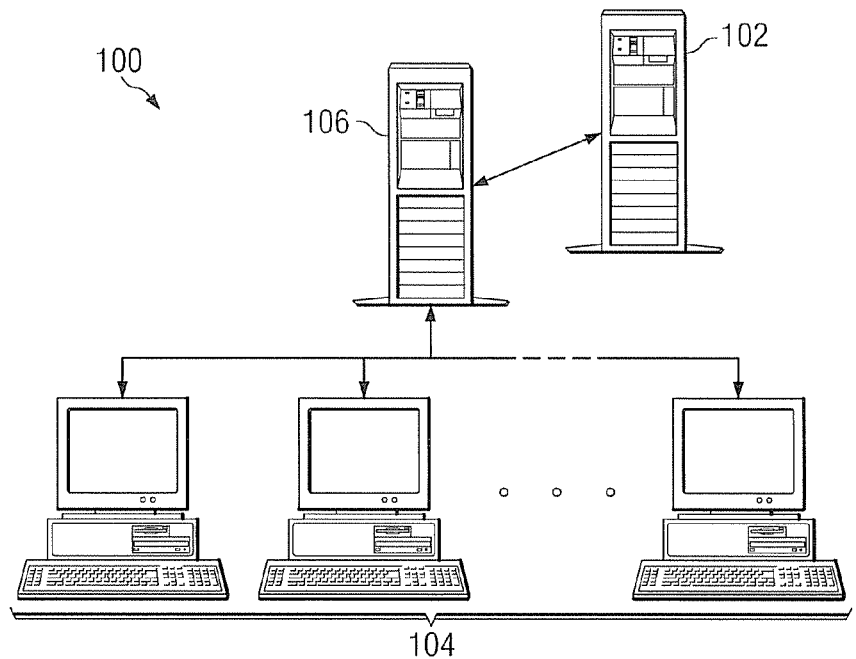
FIG. 1 is a block diagram of a data center for performing service image warehouse processing functions in accordance with one embodiment.

One embodiment is illustrated in FIG. 1, which is a block diagram of a data center automation system 100 for performing service image processing functions in accordance with one embodiment in connection with a service image warehouse. As shown in FIG. 1, the data center may include an orchestrator server 102, which in one embodiment is a Novell Zenworks Orchestration Server ("ZOS"), for allocating resources and service images to a plurality of compute servers 104, each of which represents either a physical or a virtual machine. The system 100 further includes a service image warehouse 106 in which a plurality of service images are stored in a conventional manner. As will be described in greater detail with reference to FIG. 2, service images are checked into and out of the service image warehouse 106 from and to designated ones of the compute servers 104 under the control of the server 102.

It will be noted that certain ones of the processing functions are performed during check-in of a service image to the service image warehouse 106; others of the processing functions are performed during check-out of the service image from the service image warehouse, in which case the modified service image is checked back in to the warehouse as well as being deployed to the compute server.

Figure 2:
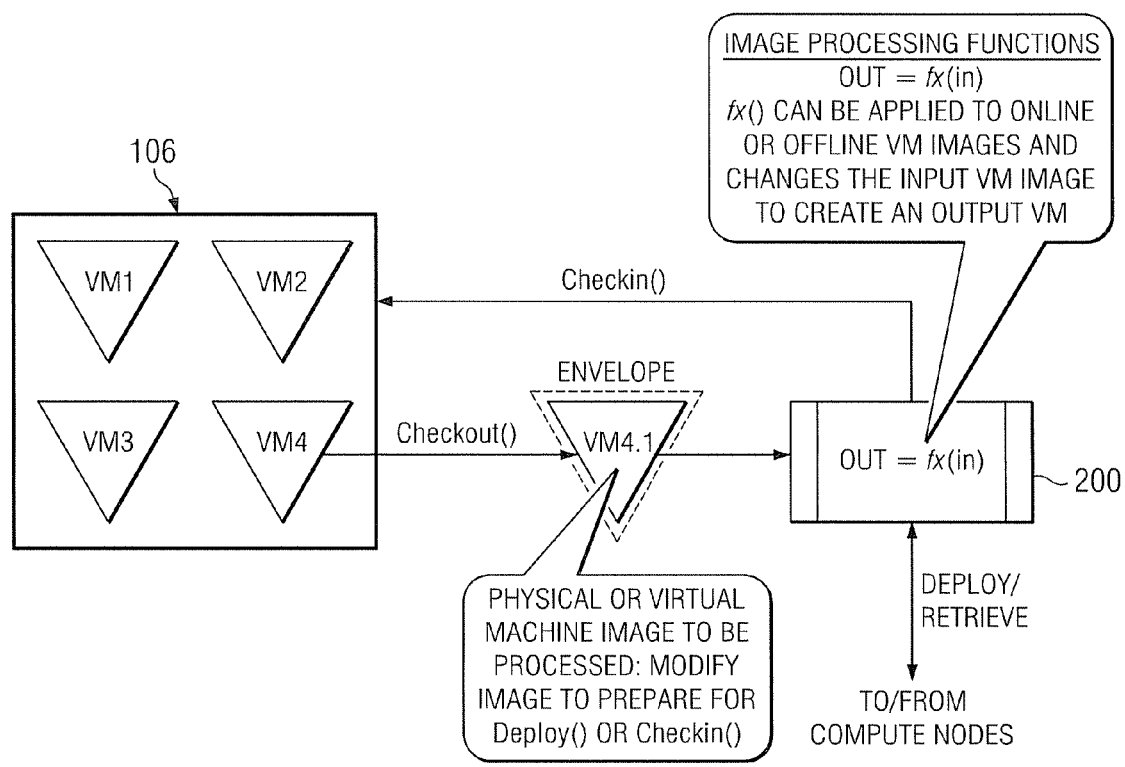
FIG. 2 is a conceptual block diagram of a method of using the data center of FIG. 1 to perform service image warehouse processing functions in accordance with one embodiment.

FIG. 2 is a conceptual block diagram of a method of using the system 100 to perform service image warehouse processing functions in accordance with one embodiment. As shown in FIG. 2, the service image warehouse 106 warehouses a plurality of service images, represented in FIG. 2 by VM1-VM4. In one aspect, during checkout of a service image, such as the VM4, from the service image warehouse 106, designated service image processing functions are applied to the VM4, as represented by a function block 200. It will be recognized that the functions can be applied to the service images either online or offline, as will be described with reference to FIG. 3. The service image is then deployed to a designated one of the compute nodes 104 (FIG. 1). If the service image is modified by the functions performed thereon (function block 200), the modified service image is checked back in to the service image warehouse 106. One example of a processing function that would be performed on check-out of a service image would be applying a security patch to the service image.

In another aspect, during check-in of the VM4 back to the service image warehouse 106, the service image is retrieved and additional service image processing functions are applied thereto, as again represented by the function block 200. One example of a processing function that would be applied on check-in of a service image would be removing a history from a browser application of the service image.

Examples of functions that may be performed at the function block 200 include, but are not limited to:
1. deleting any runtime files or data (during check-in);
2. running service image size reducing utilities (during check-in);
3. removing the rpm database in order to lock down the OS when the service image is deployed into production (during check-out or check-in);
4. running virus scan utilities (during check-in);
5. performing integrity checking utilities (during check-in other than first time);
6. performing utilities to remove unwanted material (during check-in);
7. changing configuration information, e.g., generating a Change and Configuration Management signature prior to deployment in order to be able to diff the production image for change relative to the archived Gold Master image (check-out; change configuration information; check-in);
8. applying a software patch to an offline version of the service image (check-out; apply patch; check-in);
9. applying monitoring and system tracing instrumentation as required to enable system performance profiling or tracing (during check-in); and
10. cleaning a cache (e.g., Internet browser cache) for desktop service images (during check-in).

As previously noted, the functions performed on a service image may be specified at the warehouse level, in which case the functions will be performed for all service images as they are checked out of into the warehouse 102, or at the service image-level, in which case the functions performed for the service image are specific to the service image, or a combination of both.

Figure 3A:
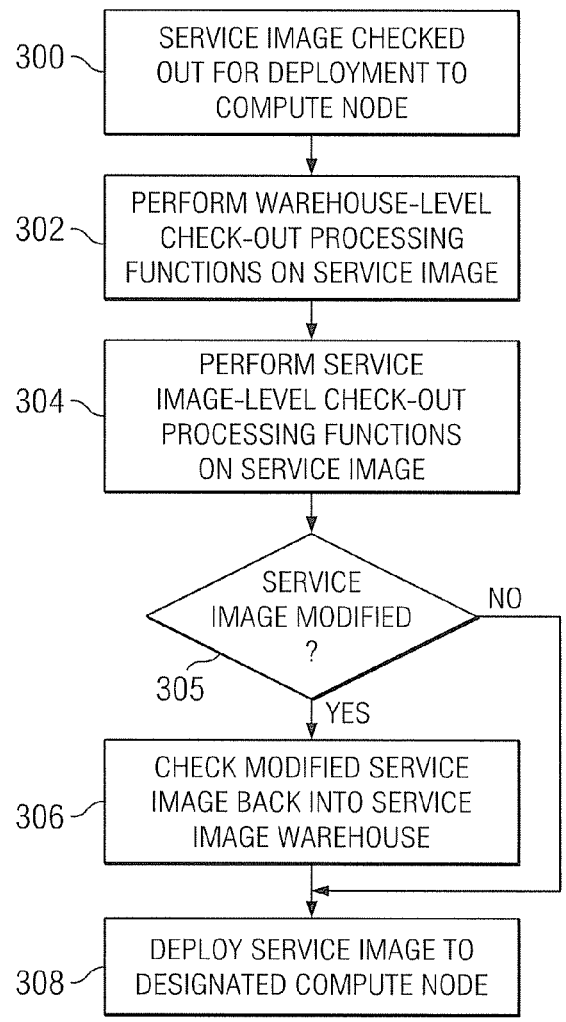
FIG. 3A is a flowchart of a method of performing designated processing functions during check-out of a service image from a service image warehouse in accordance with one embodiment.

FIG. 3A is a flowchart of a method of performing designated processing functions during check-out of a service image from a service image warehouse in accordance with one embodiment. Execution begins in step 300, in which a service image is checked out of the service image warehouse for deployment to a designated compute server. In step 302, warehouse level check-out processing functions are performed on the service image. In step 304, check-out processing functions specific to the service image are performed on the service image. In step 306, if the service image has been modified, the modified service image is checked into the service image warehouse. In step 308, the processed service image is deployed to the designated compute server.

As has been previously indicated, the processing functions may be performed either offline, in which case the functions are performed by service image warehouse or shipped to one of the compute servers 104, or online, in which case the functions are applied when the service image is running on the one of the compute servers 104 to which it has been checked out. In the case of online application, the appropriate code may be copied into the service image from the service image warehouse before it is run on the compute server. Alternatively, the code may be downloaded to the compute server after the service image is up and running thereon.

Figure 3B:
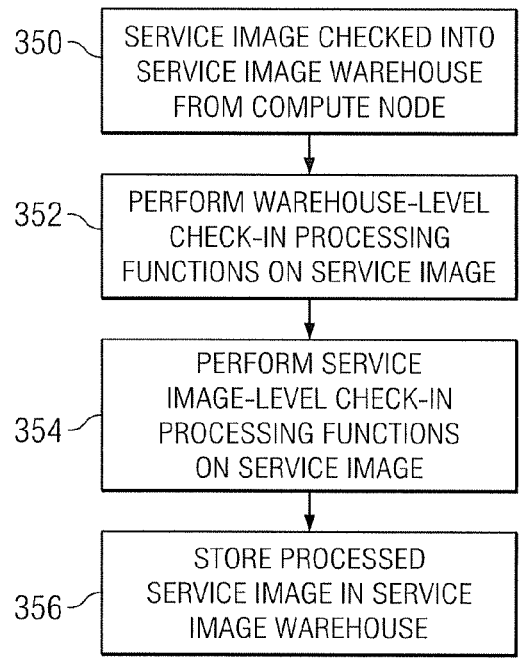
FIG. 3B is a flowchart of a method of performing designated processing functions during check-in of a service image to a service image warehouse in accordance with one embodiment.

FIG. 3B is a flowchart of a method of performing designated processing functions during check-in of a service image to a service image warehouse in accordance with one embodiment. Execution begins in step 350, in which a service image is retrieved from a compute server on which it has been running to be checked in to the service image warehouse. In step 352, warehouse level check-in processing functions are performed on the service image. In step 354, check-in processing functions specific to the service image are performed on the service image. In step 356, the processed service image is returned to the service image warehouse.

It is understood that modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

Although the present disclosure has described embodiments relating to specific networking environments, it is understood that the apparatus, systems and methods described herein could applied to other environments. While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A system for performing processing functions on a warehoused service image, the system comprising:
a service image warehouse for storing at least one service image;
means for modifying the at least one service image by performing at least one of a plurality of service image processing functions on the at least one service image contemporaneously with a user's checking the at least one service image out of the service image warehouse;

means for checking the modified at least one service image back into the service image warehouse in response to the modifying the at least one service image; and a plurality of compute nodes connected to the service image warehouse to which the modified at least one service image may be deployed, wherein each of the compute nodes comprises one of a physical machine and a virtual machine host, wherein modifying the at least one service image occurs before the service image is deployed to a designated one of the plurality of compute nodes, wherein the service image processing functions are defined at warehouse level processing functions including a virus checking applied to all service images in the service image warehouse and at service image level processing functions including locking down the modified at least one service image in the warehouse based on deploying the at least one service image to the designated one of the plurality of compute nodes.

2. The system of claim 1 wherein the means for modifying further includes means for modifying the at least one service image by performing at least one of a plurality of service image processing functions on the at least one service image contemporaneously with a user's checking the at least one service image into the service image warehouse.

3. The system of claim 2 wherein each of the service image processing functions comprise a function selected from a group consisting of:
 deleting runtime files and data;
 running service image size reducing utilities;
 removing the rpm database;
 performing integrity checking utilities;
 performing utilities to remove unwanted material;
 changing configuration information;
 applying a software patch to an offline version of the service image;
 applying monitoring and system tracing instrumentation as required to enable system performance profiling or tracing; and
 cleaning a cache.

4. The system of claim 1 wherein at least one of the selected ones of the service image processing functions is performed offline.

5. The system of claim 4 wherein the at least one of the selected ones of the service image processing functions is performed at the service image warehouse.

6. The system of claim 1 wherein at least one of the selected ones of the service image processing functions is performed online.

7. The system of claim 6 wherein the at least one of the selected ones of the service image processing functions is performed by one of the compute nodes to which the service image is checked out.

8. A method of performing processing functions on a service image stored at a service image warehouse, the method comprising:

responsive to a request to deploy the service image from the service image warehouse to a compute node, modifying the service image by performing at least one of a plurality of service image processing functions on the service image contemporaneously with a user's checking the service image out of the service image warehouse;

checking the modified service image back into the service image warehouse in response to the modifying the service image; and deploying the modified service image on the compute node, wherein the compute node comprises one of a physical machine and a virtual machine, wherein modifying the service image occurs before the service image is deployed to a designated one of the plurality of compute nodes, wherein the service image processing functions are defined at warehouse level processing functions including a virus checking applied to all service images in the service image warehouse and at service image level processing functions including locking down the modified at least one service image in the warehouse based on deploying the at least one service image to the designated one of the plurality of compute nodes.

9. The method of claim 8 further comprising, responsive to a request to retrieve the service image from the compute node, modifying the at least one service image by performing at least one of a plurality of service image processing functions on the service image and checking the at least one service image into the service image warehouse.

10. The method of claim 9 wherein the service image processing functions comprise functions selected from a group consisting of:
 deleting runtime files and data;
 running service image size reducing utilities;
 removing the rpm database;
 performing integrity checking utilities;
 performing utilities to remove unwanted material;
 changing configuration information;
 applying a software patch to an offline version of the service image;
 applying monitoring and system tracing instrumentation as required to enable system performance profiling or tracing; and
 cleaning a cache.

11. The method of claim 8 wherein the modifying is performed while the service image is not deployed.

12. The method of claim 8 wherein the modifying is performed while the service image is deployed.

* * * * *